Jan. 6, 1970 LARS-OLAV PETTERSSON ET AL 3,487,699

TIME RELAY

Filed Jan. 25, 1968          2 Sheets-Sheet 2

INVENTOR
LARS-OLAV PETTERSSON
RUNE SPANGBERG
BY *Jennings Bailey Jr.*
ATTORNEY

United States Patent Office 3,487,699
Patented Jan. 6, 1970

3,487,699
TIME RELAY
Lars-Olav Pettersson and Rune Spangberg, Vasteras, Sweden, assignors to Allmänna Svenska Elektriska Aktiebolaget, Vasteras, Sweden
Continuation-in-part of application Ser. No. 641,256, May 27, 1967. This application Jan. 25, 1968, Ser. No. 700,467
Int. Cl. F16h 5/74; H01h 7/12
U.S. Cl. 74—3.5                                            10 Claims

ABSTRACT OF THE DISCLOSURE

A synchronous motor drives a set of gears which intermesh so as to turn at different speeds. A gear is non-rotatably mounted on a shaft and displaceable therealong by a conveyer screw to mesh with one or another of such set of gears. A clutch is provided to connect or disconnect the shaft to a second gear which meshes with a third gear connected to a crown wheel of a planetary transmission, the other crown wheel of which is settable by hand. The planet wheel carrier at the end of its travel operates a device which allows the armature of a relay to drop, whereupon the motor is disconnected. At the same time, the clutch is opened and the parts returned to their initial position.

---

This application is a continuation-in-part of application Ser. No. 641,256 filed May 27, 1967, now abandoned.

BACKGROUND OF THE INVENTION

Field of the invention

The present invention relates to a time-lag relay driven by a synchronous motor.

SUMMARY OF THE INVENTION

According to the invention, the relay comprises a gear transmission coupled to the synchronous motor, a planetary gearing cooperating with a time setter and, between the two gear transmissions, a clutch operated by the relay armature for coupling the gear transmission, and a means for changing the prevailing scale range. An essentially distinctive feature of the time relay according to the invention is that the change-over means for the scale range comprises a toothed wheel which is non-rotatably mounted on a shaft and is displaced along said shaft, said toothed wheel being arranged to be displaced along the shaft to engage with a gear wheel in the gear transmission with the help of a conveyor screw arranged on a change-over shaft provided with a change-over device.

DESCRIPTION OF THE PREFERRED EMBODIMENTS

Figure 1:
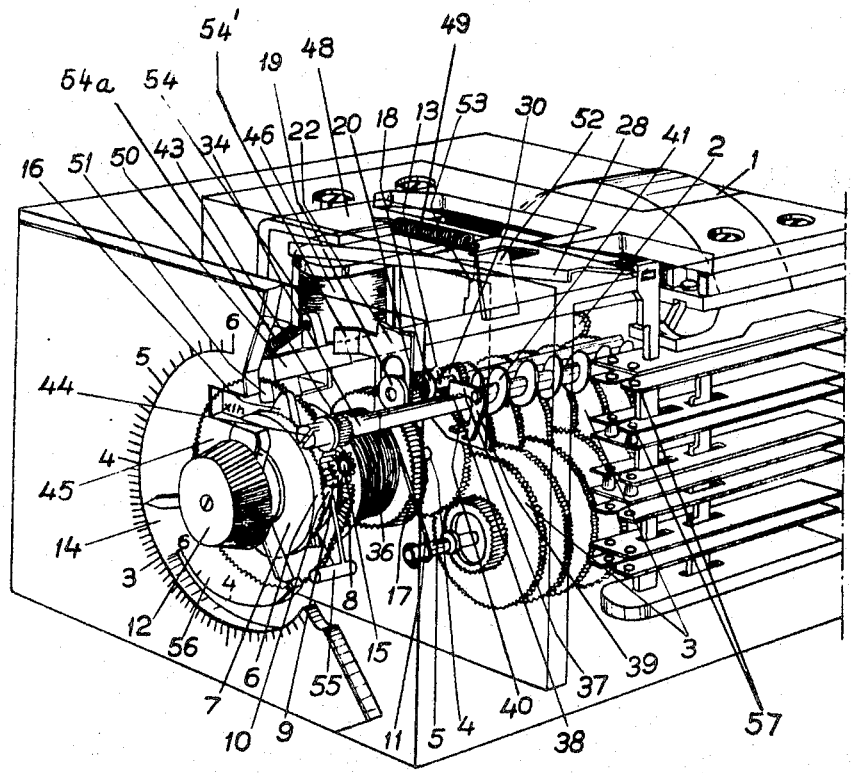
FIGURE 1 of the drawings shows the relay in perspective, with parts broken away.
Figure 1A:
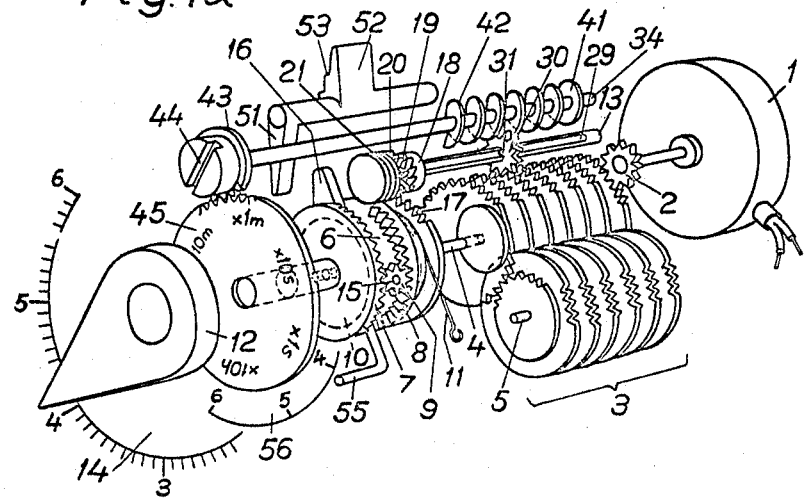
FIGURE 1a also shows a perspective view of the relay with certain parts removed.

In the following description, the time-lag relay according to the invention will be described with reference to the drawings.

On the shaft of a synchronous motor 1 is attached a toothed wheel 2 which drives a first gear of a gear transmission 3 having a suitable number of gear wheels arranged to run freely on two parallel shafts 4 and 5. Each gear wheel consists of one small and one large toothed wheel and a large toothed wheel on one of the shafts cooperates with a small toothed wheel on the other shaft.

The timing setting and release of the relay takes place with the help of a planetary gear transmission 6. The planetary gear transmission comprises a first crown wheel 7, a second crown wheel 8 and a planet wheel 9. The crown wheel 7 is connected by means of a shaft to a setting dial 12 having a pointer cooperating with a scale 14 marked from 0.2–6. The planet wheel 9 is arranged on a free-running disc 10 which supports a radial shaft 15 on which planet wheel 9 is mounted and a release lever 16, the function of which will be decribed later. The second crown wheel 8 is arranged to run freely on a shaft, suitably the shaft 4 in the gear transmission 3. The crown wheel 8 is rigidly connected to a toothed wheel 17. The crown wheel 8 and the toothed wheel 17 are arranged at a distance from each other and in the space between them is located a return spring 11. One end of the spring is attached to the crown wheel and the other end is attached to a support in the relay, for example around the shaft 5 in the gear transmission. The spring tends to turn the crown wheel 8 and the toothed wheel 17 clockwise until a stop pin on the crown wheel hits a stationary stop in the relay.

Figure 2:
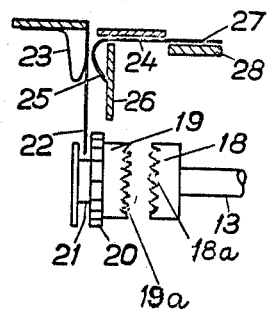
FIGURE 2 shows the means for operating the connection.

To join together the gear transmission 3 and the planetary gear transmission a clutch is used consisting of two clutch halves 18 and 19 and a toothed wheel 20, as shown in FIGURE 2. The clutch half 19 and the toothed wheel 20 are rigidly connected to each other and arranged to run freely on the shaft 21. The toothed wheel 20 is in permanent engagement with the toothed wheel 17 in the planetary gear transmission. The clutch half 19 has a circular groove 21 outside the toothed wheel 20 in which a resilient tongue 22 engages. The tongue is attached at its upper end to the relay frame and pressed by a spring 23 against a yoke 24 which is fulcrumed at 25 on a stationary part 26 of the relay frame. Spring 23 has its left-hand part (FIG. 2) secured to a part of the frame while its right-hand part is free to press against member 22. The other end 27 of the yoke is kept pressed against the upper side of the relay armature 28 by the spring 23. In FIGURE 2 the relay armature is shown in the off-position of the relay. Parts 23, 24 and 27 are broken away in FIGURE 1.

Figure 3:
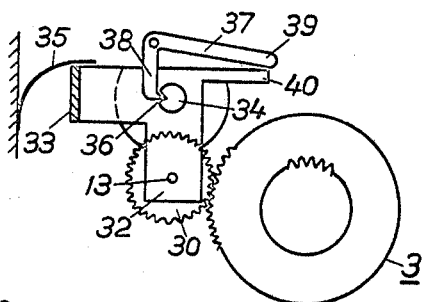
FIGURE 3 shows the means for changing over different scale ranges and FIGURE 4 shows the release means.

The shaft 13 is provided with a longitudinal groove 29 and a toothed wheel 30 having a projection 31 fitting into the groove is mounted for displacement along the shaft. As shown in FIGURE 3, the shaft is also journalled in two arms 32 on a clamp 33 which is in turn pivotably journalled on a change-over shaft 34 journalled in the relay framework.

By means of a spring 35 mounted on the relay frame, the clamp 33 is pressed counter-clockwise so that the toothed wheel 30 is kept in engagement with one of the gear wheels in the gear transmission 3. Near the journalling point of the change-over shaft 34, the shaft is provided with a groove 36 which is intended to be in engagement with one end 38 of an angled hook 37, which is journalled in the frame. The other end 39 of the hook abuts a flap 40 of the clamp 33.

As is best seen in FIGURE 1, a conveyor screw 41 is arranged on that part of the change-over shaft 34 lying opposite the gear transmission 3. The conveyor screw is arranged so that the toothed wheel 30 of the shaft 13 projects into the screw thread 42 and is carried along by this thread when the shaft 34 rotates. The thread pitch is so chosen that the toothed wheel 30 is moved from one gear wheel in the gear transmission to an adjacent gear wheel when the change-over shaft 34 is turned one revolution. The change-over shaft operated from the front of the relay with the aid of a change-over device 43 consisting of a head with a notch 44 so that the change-over can be performed by using a screw-driver. The change-over device cooperates with an index-disc 45 with indexes x1 s., x10 s., x1 min., x10 min., x1 h., x10 h. The index disc has the same number of indexes as the number of gear wheels on the shaft 5 in the gear transmission 3. The index corresponding to the time limit set is visible through a window in the front plate of the relay.

Figure 4:
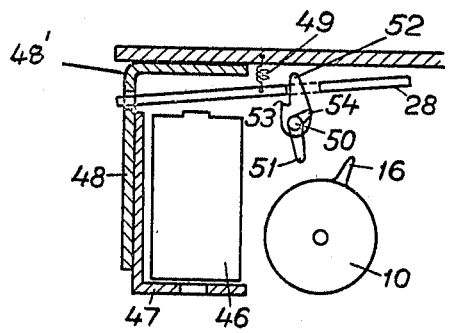

In FIGURE 4 the relay coil is designed 46. In a manner known per se, for example by means of angled plates 47 and 48, it is attached to the relay frame. The armature 28 is journalled in an opening 48' in the plate 48 and urged away from the coil by a spring 49 attached to it and to the relay frame. A release shaft 50, also visible in FIGURE 1, supports a release lever 51 intended to cooperate with the release terminal 16 on the intermediate disc 10 and a blocking lever 52 is also provided with a step 53 thereon. Another lever 54 is arranged to cooperate with a sloping surface 54' of the resilient tongue 22 if the motor 1 continues to rotate after the relay is released, so that the disc continues to rotate counter-clockwise and influence the release shaft 50. The lever 54 and the resilient tongue 22 cause the connection 18, 19 to open. Lever 54 has connected to it a spring 54a which tends to turn shaft 50 counter-clockwise.

In order to indicate how much time remains of a release period, the disc 10 is provided with an indicator 55 cooperating with a scale 56. This scale is marked in the same way as the scale 14, but has only half as great an angle range since the indicator 55 moves at half the speed at which the wheel 12 is turned when the time is set. At the same time that the synchronous motor starts to drive the planetary gear transmission, the indicator 55 moves from the value set towards zero and thus indicates continuously the time remaining until the relay picks up.

The movement of the armature 28 takes place in two steps as will be explained below, and in its movement operates to open and close various ones of the switches 57.

The relay operates in the following way:

The desired release time is set by means of the dial 12 and the change-over device 43. If the desired time is 30 minutes, the dial 12 is turned so that its indicator points to the numeral 3 and the change-over device 43 is turned until the window at the front of the relay shows x10 min.

The toothed wheel 30 has then been moved so that it engages with the third gear wheel counted from the front of the gear wheels on the shaft 4 in the gear transmission 3 as seen in FIGURE 1. When the dial 12 is turned the disc 10 with the planet wheel 9 is moved in the same direction but at half the speed at which the crown wheel 7 is turned.

Both the relay coil and the synchronous motor are so connected to the circuit through switches 57 that both are fed with current when the relay is connected, as by closing a switch connecting it to a current source. When the armature moves against the blocking surface 53 (downward in FIGS. 2 and 4), the member 24 is free to swing clockwise around the end 25 and the tongue 22 swings to the numeral 3 and the change-over device 43 is turned clutch halves 18 and 19 engage with each other.

The synchronous motor is thus connected and drives the planetary gear transmission so that the disc 10 with the release terminal moves counterclockwise in FIGURE 1. When the time set is almost up, the release terminal 16 is in contact with the release hook 51 on the release shaft and this starts to turn clockwise in FIGURE 1. When the release shaft has turned a little, the armature slides off the blocking surface 53 and falls into its final position. The circuit is then influenced by further switches 57 again so that the current to the synchronous motor is broken and other contact is made as required by the use to which the device is put. Since the armature is still in lowered position, the coupling between the gear transmission and the planetary gear transmission is closed. In order to prevent the disc in the planetary gear transmission from being driven too far if the current to the synchronous motor should not for some reason be broken when the relay armature reaches its final position, the extra lever 54 on the release arm by engagement with sloping surface 54' acts on the resilient tongue 22 in FIGURE 2 so that the clutch is opened. As soon as the clutch has been opened, the armature returns because the current to the coil is broken by opening of the supply switch, the planetary gear transmission rapidly returns to its initial position and the relay is ready for a new operation. The shifting of the wheel 30 from one to another of the wheels 3, produced by the turning of the threaded member 41, takes place as follows: When shaft 34 is turned, the first moment of the turning causes the end 38 of the angled hook 37 to be pressed out of the groove 36. During this moment the hook 37 is turned clockwise and the end 39 of hook 37 turns the flap 40 downwards and clamp 33 is turned clockwise. By this, the wheel 30 is brought out of engagement with any wheel of the gear transmission 3. During almost the entire turning movement of shaft 34, wheel 30 is completely free from and situated outside of the transmission 3. When shaft 34 has been turned almost one turn, the end 38 of hook 37 will enter groove 36 due to the turning movement of spring 35. At this time, wheel 30 on shaft 13 has been moved along axis 13 and is now opposite an adjacent gear of transmission 3. When the end 38 enters groove 36, wheel 30 is in engagement with a wheel in the transmission 3.

The long time, up to 60 hours, which the relay may be connected before an operation takes place, makes it necessary to insert a clutch between the gear transmission and the planetary gear transmission and arrange for this clutch to be opened when the relay has operated. Otherwise the re-setting time would be impermissibly long. By dividing the closing movement of the armature into two parts an excellent opportunity is available to influence the clutch in a simple manner at the same time as they relay starts.

The extra hook on the release shaft also provides a safe emergency release for the clutch, which would not be obtained if the clutch were influenced electrically.

Since the time setting of the planetary gear transmission takes place by turning one of the crown wheels, the great advantage is obtained that an alteration of the time set may be accomplished even if the relay has started and the synchronous motor drives the other crown wheel in the planetary gear transmission. Change-over of the first crown wheel causes only the planet wheel to accompany it, regardless of whether the other crown wheel is stationary or in operation.

Such an alteration of the time set to another well-defined release time is possible only because of the indicator 55 arranged on the disc 10, which always shows how much of the release time remains. Thus, if a different time is required, longer or shorter, the dial 12 is turned until the indicator 55 shows on its scale 56 the newly set time for the release.

What is claimed is:

1. Timing device comprising a synchronous motor, a relay having an armature, said device comprising a gear transmission connected to the synchronous motor, a time setter, a planetary gear transmission cooperating with the time setter, a clutch operatively connecting said two gear transmissions, means operatively connecting said clutch to the relay armature to close the clutch when the relay is energized for joining said gear transmissions, means for changing the prevailing scale range of said gear transmission, and means responsive to movement of the planetary gear transmission by an amount set on said time setter to de-energize said synchronous motor.

2. Timing device as claimed in claim 1, in which said planetary gear transmission includes first, second and third gears, the first of said gears being connected to said time setter, the second of said gears being operatively connected to one of the parts of the clutch, and the third gear meshing with the first and second gears, the third gear having said responsive means operatively connected therewith to produce said deenergization of the synchronous motor.

3. Timing device as claimed in claim 2, in which means are provided for normally limiting movement of said armature when said relay is energized to a part only of its range of movement, said armature at the end of such part of its range operating to close the clutch, and said means connected with said third gear including means operatively connected with said movement limiting means to render them inoperative so as to permit movement of said armature to its full range of movement.

4. Timing device as claimed in claim 3, means operatively connected with said movement limiting means and responsive to the movement thereof to inoperative position to disengage said clutch.

5. Timing device as claimed in claim 1, in which means are provided for normally limiting movement of said armature when said relay is energized to a part only of its range of movement, said armature at the end of such part of its range operating to close the clutch, and said means responsive to movement of the planetary gear transmission including means operatively connected with said movement limiting means to render them inoperative so as to permit movement of said armature to its full range of movement.

6. Timing device as claimed in claim 5, means operatively connected with said movement limiting means and responsive to the movement thereof to inoperative position to disengage said clutch.

7. Timing device comprising a synchronous motor, a relay having an armature, a first gear transmission connected to the synchronous motor, a time setter, a planetary gear transmission cooperating with the time setter, a clutch arranged between said two gear transmissions, means operatively connecting said clutch to the relay armature to close the clutch when the relay is energized for joining said gear transmissions, means for changing the prevailing scale range of said first gear transmission comprising a first shaft, a toothed wheel nonrotatably mounted on but displaceable along said shaft, a change-over shaft provided with a change-over device, a conveyer screw mounted on said change-over shaft, said toothed wheel being engaged by said conveyer screw for displacing said toothed wheel along said first shaft.

8. Timing device according to claim 7, a clamp, said first shaft being journalled in said clamp, said clamp being pivotably journalled around said change-over shaft, said change-over shaft having a groove, a knee lever journalled in the relay frame, one arm of said knee lever engaging said clamp, the second arm of said knee lever engaging said groove when a scale range is exactly set.

9. Timing device according to claim 7, a release shaft journalled in the relay frame, said release shaft being provided with a releasing lever arranged to cooperate with the planetary gear transmission, said release shaft being provided with a blocking lever arranged to cooperate with the relay armature, said blocking lever being provided with a blocking surface, the relay armature abutting said blocking surface when the armature has completed approximately half its movement under the action of said relay.

10. Timing device according to claim 7, a resilient tongue attached to the relay frame, said clutch comprising two parts, one of said parts having a circular groove, the free end of said resilient tongue being in operable contact with said groove, a curved yoke having one of its ends pressed against a rigid part of the relay frame, a spring pressing the other end against the relay armature, said resilient tongue being pressed against said yoke by said spring, said yoke and resilient tongue keeping said clutch closed as long as the relay armature is acted on by the relay coil.

References Cited
UNITED STATES PATENTS 2,979,969   4/1961   Fichter _____ 74—3.52 X MILTON KAUFMAN, Primary Examiner U.S. Cl. X.R.

200—38